United States Patent
Chen

(10) Patent No.: US 8,737,063 B2
(45) Date of Patent: May 27, 2014

(54) FASTENING DEVICE FOR HARD DISK DRIVE

(75) Inventor: Chih-Hua Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 23 days.

(21) Appl. No.: 13/609,202

(22) Filed: Sep. 10, 2012

(65) Prior Publication Data

US 2014/0049903 A1    Feb. 20, 2014

(30) Foreign Application Priority Data

Aug. 15, 2012   (TW) .............................. 101129637 A

(51) Int. Cl.
*H05K 7/00*   (2006.01)

(52) U.S. Cl.
USPC ............ 361/679.58; 361/679.33; 361/679.34; 361/679.37; 361/379.39

(58) Field of Classification Search
CPC ......... G06F 1/181; G06F 1/183; G06F 1/184; G06F 1/187; G06F 1/188; G06F 1/1616; G06F 1/1656; G06F 1/1679; G11B 33/08; G11B 33/124; G11B 33/128; G11B 25/043; H05K 7/1411
USPC .......... 361/679.33–679.39, 679.58, 732, 747, 361/724–727, 807, 810, 825; 312/223.1, 312/223.2, 332.1, 333

See application file for complete search history.

(56) References Cited

U.S. PATENT DOCUMENTS

| | | | |
|---|---|---|---|
| 6,256,204 B1 * | 7/2001 | Wormsbecher et al. | 361/727 |
| 8,434,726 B2 * | 5/2013 | Chen et al. | 248/220.21 |
| 8,480,039 B2 * | 7/2013 | Chang | 248/27.1 |
| 2009/0167124 A1 * | 7/2009 | Lee et al. | 312/223.2 |
| 2010/0052485 A1 * | 3/2010 | Wang et al. | 312/223.2 |
| 2013/0092807 A1 * | 4/2013 | Chen et al. | 248/220.21 |

* cited by examiner

Primary Examiner — Lisa Lea Edmonds
Assistant Examiner — Christopher L Augustin
(74) Attorney, Agent, or Firm — Novak Druce Connolly Bove + Quigg LLP

(57) ABSTRACT

A fastening device includes a bracket, two hook devices, and an operation member. The bracket includes two parallel clamping arms sandwiching an HDD, and a connection plate connected between the clamping arms. Each clamping arm defines a through slot. Each hook includes an end portion engaging in an inner side of the corresponding clamping arm, a locking portion received in the corresponding through slot, and a slanting connection portion connected between the end portion and the locking portion. Two locking poles extend from the locking portion to engage in locking holes defined in the HDD. The operation member is slidably connected to the connection plate. When the operation member is manipulated toward the connection plate, the connection plate abuts against the connection poles of the hook devices. The connection poles are deformed away from the HDD, to disengage the locking poles from the HDD.

10 Claims, 5 Drawing Sheets

FASTENING DEVICE FOR HARD DISK DRIVE

BACKGROUND

1. Technical Field

The present disclosure relates to a device for fastening a hard disk drive (HDD).

2. Description of Related Art

HDDs are generally screwed to a chassis of a server by a number of screws. However, it is time-consuming to screw or unscrew a large number of HDDs to or from the server.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
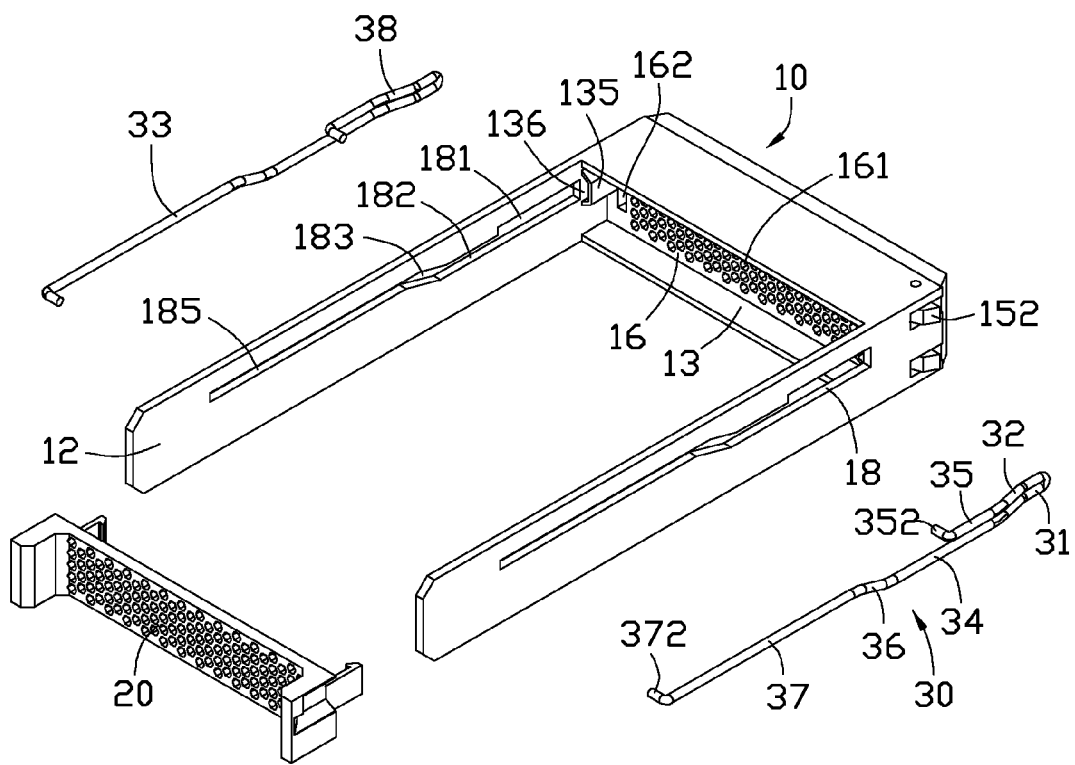
FIG. 1 is an exploded, isometric view of an embodiment of a fastening device, wherein the fastening device includes a bracket and an operation member.
Figure 2:
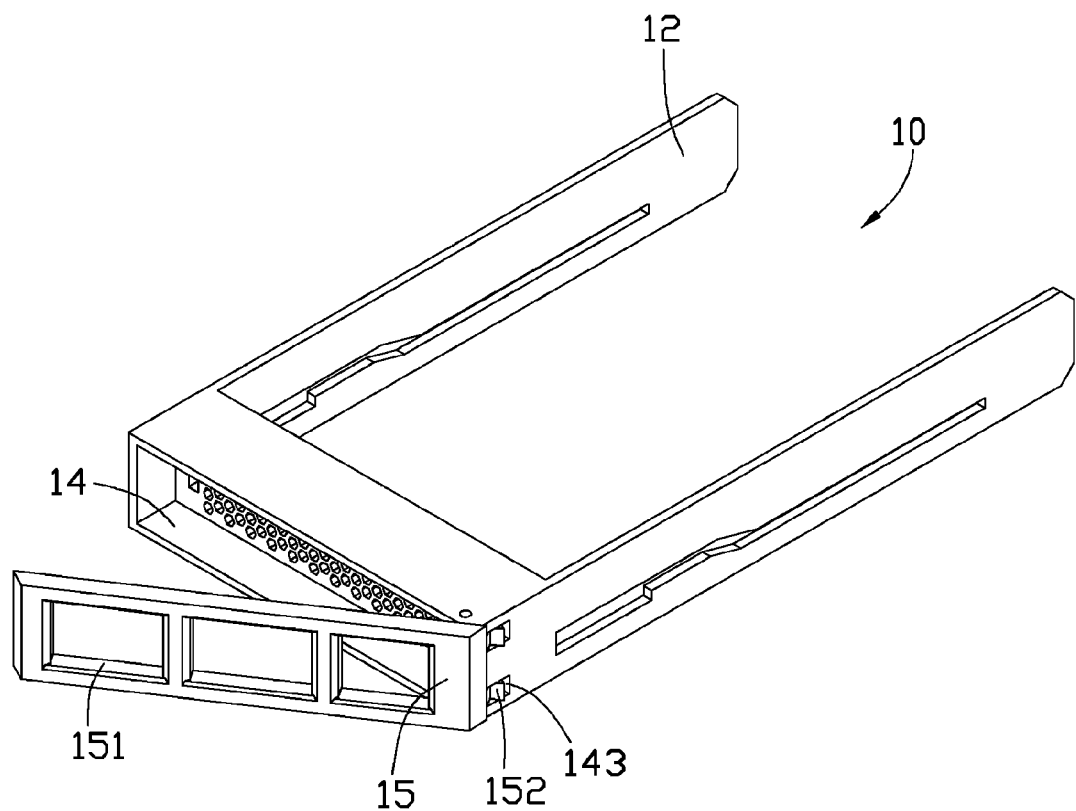
FIG. 2 is an inverted view of the bracket of FIG. 1.
Figure 4:
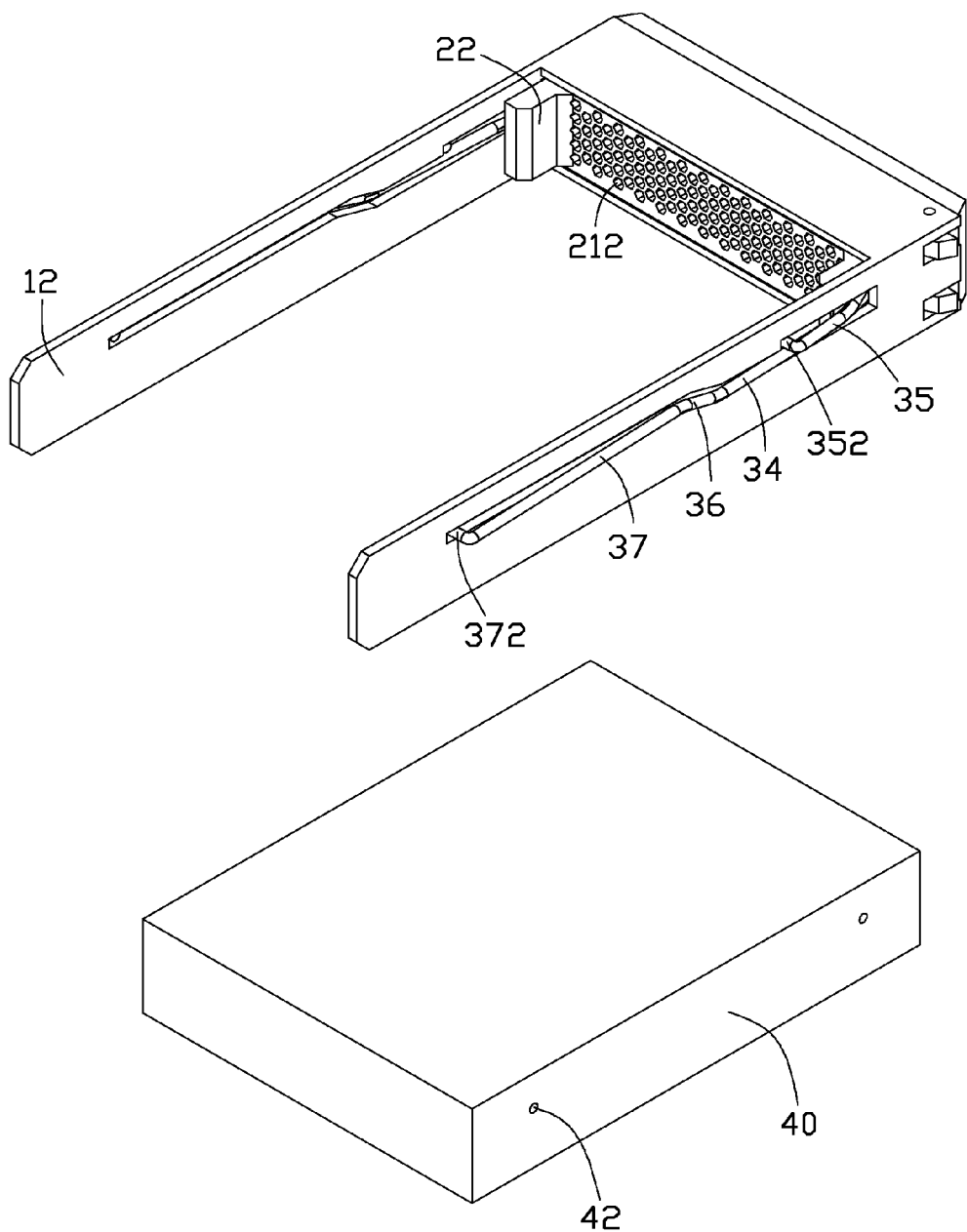
FIG. 4 is an assembled, isometric view of the fastening device of FIG. 1, together with a hard disk drive.

FIGS. 1, 2 and 4 show an embodiment of a fastening device for fastening a hard disk drive (HDD) 40. Two locking holes 42 are defined in each of two opposite sides of the HDD 40. The fastening device includes a bracket 10, an operation member 20, and two hook devices 30.

The bracket 10 includes two parallel clamping arms 12 and a connection plate 16 perpendicularly connected between front ends of the clamping arms 12.

A recess 13 is defined in a rear side of the connection plate 16, a receiving slot 14 is defined in a front side of the connection plate 16, and a plurality of ventilation holes 161 is defined in the connection plate 16 to communicate the recess 13 and the receiving slot 14. A first end of a handle 15 is received in the receiving slot 14, and is rotatably connected to a front end of one of the clamping arms 12. Two through slots 143 are defined in said one of the clamping arms 12. The handle 15 defines a plurality of openings 151. Two blocks 152 extend from the first end of the handle 15. When the handle 15 covers a front side of the receiving slot 14, the blocks 152 extend out of the bracket 10 through the through slots 143. When the handle 15 is rotated outward, the blocks 152 are gradually received in the receiving slot 14. Two through holes 162 are defined in opposite ends of the connection plate 16. A bridge-shaped engaging portion 135 extends from an inner side of each clamping arm 12. Each engaging portion 135 and the corresponding clamping arm 12 bound a through hole 136 near the corresponding through hole 162.

Each clamping arm 12 longitudinally defines an elongate through slot 18. The through slot 18 includes a wide slot 181 adjacent to the connection plate 16, an extension slot 182 extending back from a lower portion of the wide slot 181, a slanting slot 183 extending back and up from a rear end of the extension slot 182, and a narrow slot 185 extending back from a rear end of the slanting slot 183. The narrow slot 185 aligns with an upper portion of the wide slot 181.

Figure 3:
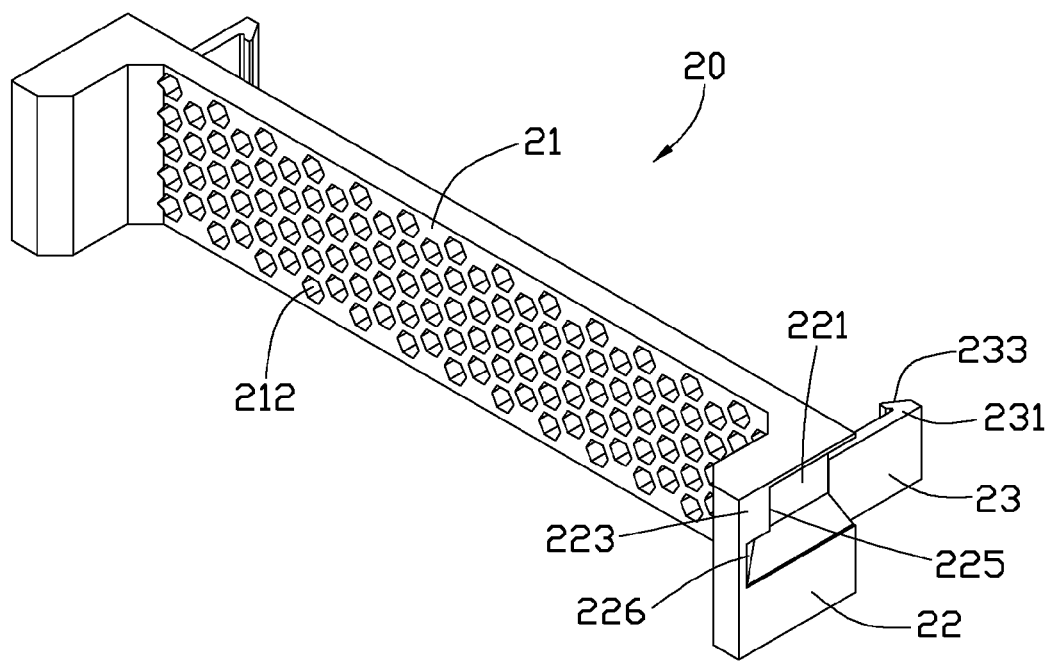
FIG. 3 is an enlarged view of the operation member of FIG. 1.

FIG. 3 shows the operation member 20 including a base plate 21, two extension portions 22 extending back from opposite ends of the base plate 21, and two substantially L-shaped hooks 23 extending forward and adjacent to the opposite ends of the base plate 21. The base plate 21 defines a plurality of ventilation holes 212. A groove 221 is defined in an outer side of each extension portion 22. An abutting block 223 is formed from an upper portion of a rear end of each groove 221. The abutting block 223 includes a front edge 225. The groove 221 includes a rear edge 226 in a lower portion. A hooking portion 231 is located at a front end of each hook 23. A guiding surface 233 is formed on each hooking portion 231.

FIG. 1 shows each hook device 30 is made of material which has good resilience and rigidity, such as a steel wire. The hook device 30 includes a substantially U-shaped end portion 31, a connection portion 38 extending from the end portion 31, and a locking portion 33 extending from the connection portion 38. The connection portion 38 includes two parallel connection poles 32 extending backward and outward from two distal ends of the end portion 31. The locking portion 33 includes a first hooking pole 35 extending back from a rear end of the upper connection pole 32, an extension pole 34 longer than the first hooking pole 35 extending back from a rear end of the lower connection pole 32, a slanting pole 36 extending up and back from a rear end of the extension pole 34, and a second hooking pole 37 extending back from a rear end of the slanting pole 36. A first locking pole 352 extends substantially perpendicularly inward from a rear end of the first hooking pole 35. A second locking pole 372 extends substantially perpendicularly inward from a rear end of the second hooking pole 37.

Figure 5:
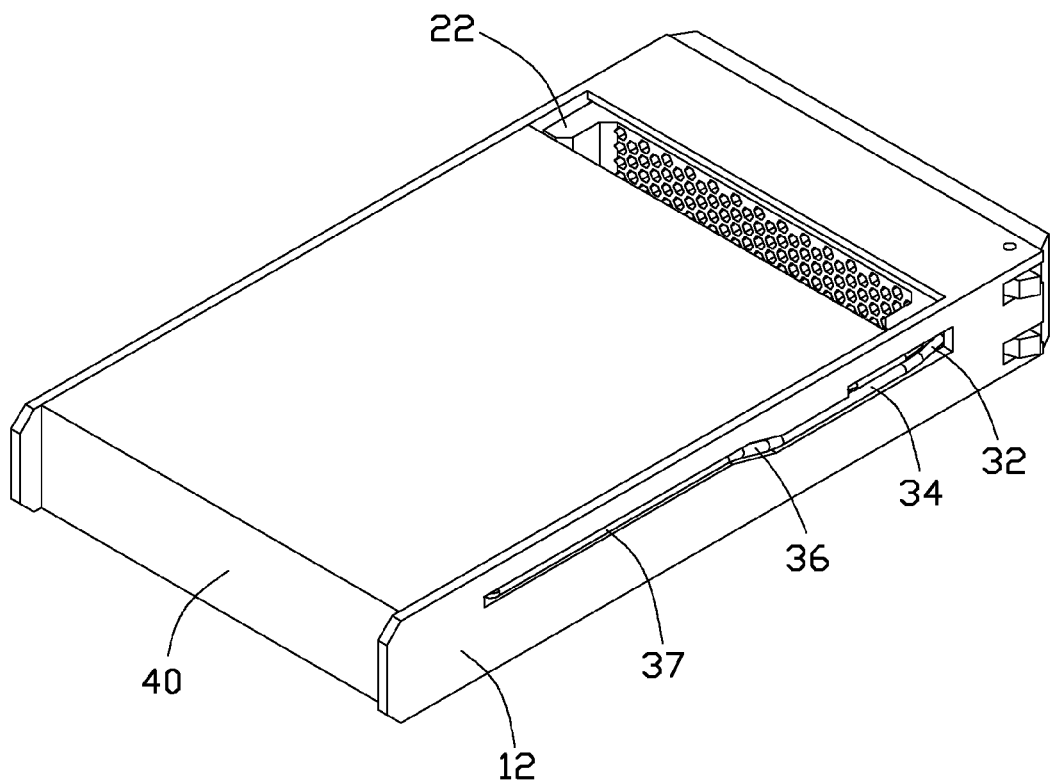
FIG. 5 is an assembled, isometric view of FIG. 4.

FIGS. 4 and 5 show in assembly, the end portions 31 respectively engage in the through holes 136. Each first hooking pole 35 is received in the upper portion of the corresponding wide slot 181. Each extension pole 34 is received in the lower portion of the corresponding wide slot 181 and the corresponding extension slot 182. Each slanting pole 36 is received in the corresponding slanting slot 183. Each second hooking pole 37 is received in the corresponding narrow slot 185. The first and second locking poles 352 and 372 extend out of inner sides of the clamping arms 12. The hooks 23 of the operation member 20 respectively extend through the through holes 162, guided by the guiding surfaces 233. The connection poles 32 of each hook device 30 are partially received in the corresponding groove 221. An outer side of each abutting block 223 abuts against the corresponding first hooking pole 35. An outer side of each extension portion 22 below the abutting block 223 abuts against the corresponding extension pole 34.

To fasten the HDD 40, the operation member 20 is manipulated to move toward the connection plate 16, with the front edge 225 abutting against and moving the upper connection pole 32 outward, and the rear edge 226 abutting against and moving the lower connection pole 32 outward. As a result, the first and second hooking poles 35, 37 are moved outward, with the first and second locking poles 352, 372 retracted in the through slot 18. The HDD 40 is then placed between the clamping arms 12. The operation member 20 is released, and the connection poles 32 are restored and bias the operation member 20 to move back. The first and second locking poles 352 and 372 are restored and engage in the corresponding locking holes 42. Thereby, the HDD 40 is fastened to the bracket 10.

Moreover, when the handle 15 is rotated outward, the blocks 152 are retracted in the receiving slot 14. The fastening device with the HDD 40 can be mounted in a receiving space of a chassis. The handle 15 is rotated inward, to allow the blocks 152 to extend out of the corresponding clamping arm 12. The blocks 152 can engage the fastening device and the HDD 40 in the receiving space.

In detaching the HDD 40, an operator only needs to force the operation member 20 toward the connection plate 16, the locking portions 33 are moved outward, the first and second locking poles 352 and 372 withdraw from the locking holes 42, and the HDD 40 is easily taken out. In assembly, the operator only needs to force the operation member 20 toward the connection plate 16, the locking portions 33 are moved outward, the HDD 40 is placed between the clamping arms 12, and then the operation member 20 is released, the first and second locking poles 352 and 372 are restored and lock the HDD 40. Thus, mounting efficiency of the HDD 40 is high.

In another embodiment, the connection portion 38 of each hook device 30 may include only one connection pole 32, the locking portion 33 includes only one hooking pole extending from the connection pole 32, and the first locking pole 352 and the second locking pole 372 extend from the only hooking pole.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A fastening device for a hard disk drive (HDD), the fastening device comprising:
    a bracket comprising two parallel clamping arms for sandwiching the HDD, and a connection plate connected between the clamping arms, each clamping arm longitudinally defining an elongate first through slot;
    two hook devices each comprising an end portion engaging in an inner side of the corresponding clamping arm near the connection plate, a locking portion received in a corresponding one of the first through slots, and a slanting connection portion connected between the end portion and the locking portion, a first locking pole and a second locking pole both extending from the locking portion to engage in locking holes defined in a corresponding side of the HDD; and
    an operation member slidably connected to the connection plate;
    wherein when the operation member is manipulated toward the connection plate, the connection plate abuts against the connection portions of the hook devices to move the connection portions outward, thereby disengaging the first and second locking poles from the HDD.

2. The fastening device of claim 1, wherein a recess is defined in a rear side of the connection plate, the connection plate defines two first through holes, the operation member comprises a base plate and two substantially L-shaped hooks, and the hooks deformably extend through the first through holes to slidably connect the operation member to the connection plate.

3. The fastening device of claim 2, wherein a bridge-shaped engaging portion extends from an inner side of each clamping arm, located in the recess, each engaging portion and the corresponding clamping arm bound a second through hole, the end portions respectively engage in the second through holes.

4. The fastening device of claim 2, wherein a receiving slot is defined in a front side of the connection plate, a first end of a handle is rotatably connected to one of the clamping arms, a block extends from the first end of the handle, a second through slot is defined in said one of the clamping arms, when the handle covers the receiving slot, the block extends out of the bracket through the second through slot, when the handle is rotated outward, the block is gradually received in the receiving slot.

5. The fastening device of claim 4, wherein the connection plate and the base plate both define a plurality of ventilation holes, the handle defines a plurality of openings.

6. The fastening device of claim 1, wherein the end portion of each hook device is substantially U-shaped, the connection portion comprises two parallel connection poles slantingly extending outward and backward from two distal ends of the end portion and arranged one above the other, the locking portion comprises a first hooking pole extending back from a rear end of the upper connection pole, an extension pole longer than the first hooking pole extending back from a rear end of the lower connection pole, a slanting pole extending up and back from a rear end of the extension pole, a second hooking pole extending back from a rear end of the slanting pole, the first locking pole substantially perpendicularly extends from a rear end of corresponding first hooking pole, and the second locking pole substantially perpendicularly extends from a rear end of the second hooking pole.

7. The fastening device of claim 6, wherein the first through slot of each clamping arm comprises a wide slot adjacent to the connection plate, an extension slot extending back from a lower portion of the wide slot, a slanting slot extending back and up from a rear end of the extension slot, and a narrow slot extending back from a rear end of the slanting slot, the first hooking pole is received in an upper portion of the wide slot, the extension pole is received in the lower portion of the wide slot and the extension slot, the slanting pole is received in the slanting slot, and the second hooking pole is received in the narrow slot.

8. The fastening device of claim 6, wherein the operation member comprises a base plate and two extension portions extending from opposite ends of the base plate, a groove is defined in an outer side of each extension portion to receive the connection poles of the corresponding hook device, when the operation member is manipulated to move toward the connection plate, a rear end of each groove abuts against the connection poles of the corresponding hook device.

9. The fastening device of claim 8, wherein an abutting block is formed from an upper portion of the rear end of each groove, when the operation member is manipulated to move toward the connection plate, a front edge of the abutting block abuts against the upper connection pole, a rear edge located at a lower portion of the groove abuts against the lower connection pole.

10. The fastening device of claim 1, wherein the hook devices are made from steel wires.

* * * * *